United States Patent
Maintz et al.

(10) Patent No.: US 10,161,146 B2
(45) Date of Patent: Dec. 25, 2018

(54) ON-SITE MOBILE FACILITY

(71) Applicant: SITECOVER APS, Haslev (DK)

(72) Inventors: Jacob Maintz, Haslev (DK); Claus Hansen, Sorø (DK)

(73) Assignee: SITECOVER APS, Haslev (DK)

( * ) Notice: Subject to any disclaimer, the term of this patent is extended or adjusted under 35 U.S.C. 154(b) by 173 days.

(21) Appl. No.: 15/106,502

(22) PCT Filed: Dec. 19, 2014

(86) PCT No.: PCT/EP2014/078630
§ 371 (c)(1),
(2) Date: Jun. 20, 2016

(87) PCT Pub. No.: WO2015/091896
PCT Pub. Date: Jun. 25, 2015

(65) Prior Publication Data
US 2016/0298345 A1    Oct. 13, 2016

(30) Foreign Application Priority Data

Dec. 20, 2013  (EP) .................................... 13199074
Jan. 29, 2014  (EP) .................................... 14153073
(Continued)

(51) Int. Cl.
*E04G 21/28* (2006.01)
*E04G 21/24* (2006.01)
(Continued)

(52) U.S. Cl.
CPC ........... *E04G 21/28* (2013.01); *E04G 21/242* (2013.01); *E04H 15/18* (2013.01); *E06B 9/0692* (2013.01);
(Continued)

(58) Field of Classification Search
CPC . E04G 21/28; E04G 21/242; E04G 2021/248; E04H 15/18; E04H 15/58; E06B 9/0692; E06B 2009/2622
(Continued)

(56) References Cited

U.S. PATENT DOCUMENTS 1,363,407 A * 12/1920 Goudie ..................... E04C 3/38
135/908
2,124,242 A *  7/1938 Bellman ............. E04B 1/34326
52/158
(Continued)

FOREIGN PATENT DOCUMENTS

DE    697 00 213     1/2000
EP    2 014 866      1/2009
(Continued)

OTHER PUBLICATIONS

International Search Report and Written Opinion for PCT/EP014/078630, dated Jun. 19, 2015, 21 pages.
(Continued)

*Primary Examiner* — Robert Canfield
(74) *Attorney, Agent, or Firm* — Nixon & Vanderhye P.C.

(57) ABSTRACT

The present invention relates to an on-site mobile facility for shielding from wind exerting a wind load on the facility, rain or snow when constructing, renovating or assembling a building, a bridge or a wind turbine, the on-site mobile facility covering an area having boundaries and corners, comprising: a plurality of modules, each module having a module roof structure, the module roof structures being mounted as a facility roof structure connecting horizontal beams of the module roof structures, the facility roof structure having edges and the horizontal beams defining the edges which are supported by legs, the legs and the beams defining side areas, the side areas being covered by a shielding arrangement, the shielding arrangement of the side
(Continued)

area comprising elongated elements, and cover material, such as tarpaulin, being arranged between the elements and connected therewith, wherein the on-site mobile facility further comprises a guide system for guiding the shielding arrangement of the side area, the guide system being slidably connecting the elements with one of the beams or the adjacent legs so as to at least partly uncover the side areas, so that wind is allowed to pass through the facility by passing through the uncovered part of the side area and out through an uncovered part of the side area on another side of the on-site mobile facility to reduce the wind load on the facility in order for the facility to remain unaffected by the wind load during heavy winds. The present invention also relates to a facility mounting method for mounting the on-site mobile facility according to the present invention.

21 Claims, 12 Drawing Sheets

(30) Foreign Application Priority Data

Jan. 29, 2014 (EP) ...................................... 14153075
Jan. 29, 2014 (EP) ...................................... 14153082

(51) Int. Cl.
*E04H 15/18* (2006.01)
*E06B 9/06* (2006.01)
*E06B 9/262* (2006.01)

(52) U.S. Cl.
CPC ................... *E04G 2021/248* (2013.01); *E06B 2009/2622* (2013.01); *Y02B 10/30* (2013.01)

(58) Field of Classification Search
USPC .......... 52/79.12, 63, 64, 222, 745.06, 651.1, 52/DIG. 12, DIG. 14, 81.2, 81.3, 90.1, 52/DIG. 10, 79.5; 135/903, 905, 908, 97, 135/117, 159, 160, 93; 160/84.04
See application file for complete search history.

(56) References Cited

U.S. PATENT DOCUMENTS

| | | | | |
|---|---|---|---|---|
| 2,513,729 A | * | 7/1950 | Lemen | E04H 15/58 135/118 |
| 2,764,107 A | * | 9/1956 | Niswonger | E04B 1/34326 135/122 |
| 3,103,709 A | * | 9/1963 | Bolt | E04B 1/343 52/125.2 |
| 3,481,073 A | * | 12/1969 | Yoshida | A01G 9/22 47/17 |
| 4,229,914 A | * | 10/1980 | Lucas | E04B 1/3441 135/119 |
| 4,245,809 A | * | 1/1981 | Jackson | E04B 1/1903 249/15 |
| 4,890,634 A | * | 1/1990 | Dalo | E04H 15/34 135/99 |
| 4,961,297 A | * | 10/1990 | Bernard | E04B 1/34315 52/655.1 |
| 5,000,211 A | * | 3/1991 | Speare | E04B 1/3441 135/100 |
| 5,291,931 A | * | 3/1994 | Kraeutler | E06B 9/063 160/84.01 |
| 5,379,823 A | * | 1/1995 | Kraeutler | E06B 9/0669 160/271 |
| 5,592,789 A | * | 1/1997 | Liddell, Sr. | E04B 1/24 52/222 |
| 5,809,699 A | * | 9/1998 | Joly | E06B 9/0692 160/1 |
| 8,074,697 B2 | * | 12/2011 | Iglesias Ballester | E06B 9/063 160/133 |
| 2003/0014928 A1 | * | 1/2003 | Kerney | E04B 1/02 52/90.1 |
| 2015/0361703 A1 | * | 12/2015 | McDonald | E06B 3/44 160/113 |

FOREIGN PATENT DOCUMENTS

| | | |
|---|---|---|
| FR | 2 861 121 | 4/2005 |
| FR | 2 901 820 | 12/2007 |
| JP | 58-13862 | 1/1983 |
| JP | 10-212821 | 8/1998 |
| JP | 2004-324065 | 11/2004 |
| JP | 2008-007938 | 1/2008 |

OTHER PUBLICATIONS

Extended Search Report for EP 13199074, dated Apr. 9, 2014, 13 pages.

* cited by examiner

ON-SITE MOBILE FACILITY

This application is the U.S. national phase of International application No. PCT/EP2014/078630 filed 19 Dec. 2014, which designated to the U.S. and claims priority to EP Patent Application Nos. 13199074.9 filed 20 Dec. 2013, 14153073.3filed 29 Jan. 2014, 14153075.8 filed 29 Jan. 2014, and 14153082.4 filed 29Jan. 2014, the entire contents of each of which are hereby incorporated by reference.

FIELD OF THE INVENTION

The present invention relates to an on-site mobile facility for shielding when constructing, renovating or assembling a building, a bridge or a wind turbine, or when building temporary sports arenas, amusement facilities, or concert venues. The present invention also relates to a facility mounting method for mounting the on-site mobile facility according to the present invention.

BACKGROUND ART

When renovating buildings or making a metro station below the ground, such constructions are not easily covered during the construction period. Thus, covering facilities have to be very strong to have the required wide, free span and are therefore made to be of a more permanent character in order to be able to bear this wide free span and withstand the wind forces acting on the facility during high winds. Furthermore, in the northern countries, such constructions have to withstand the heavy load from snowfall.

Furthermore, the assembly of such temporary cover or production facility over an existing building or future underground station is also very difficult, as the cranes for lifting the covering structures cannot stand underneath due to the building to be renovated or the fact that there is a hole in the ground where the descent to the station is to be built. Therefore, very large and thus very expensive cranes are required for mounting such cover or production facility. And this adds substantial costs to the process of renovating a building or constructing an underground station.

SUMMARY OF THE INVENTION

It is an object of the present invention to wholly or partly overcome the above disadvantages and drawbacks of the prior art. More specifically, it is an object to provide an improved on-site facility which is easier to mount over a large element such as a building, a bridge, a wind turbine or a future railway station.

The above objects, together with numerous other objects, advantages, and features, which will become evident from the below description, are accomplished by a solution in accordance with the present invention by an on-site mobile facility for shielding from wind exerting a wind load on the facility, rain or snow when constructing, renovating or assembling a building, a bridge or a wind turbine, the on-site mobile facility covering an area having boundaries and corners, comprising:
 a plurality of modules, each module having a module roof structure, the module roof structures being mounted as a facility roof structure connecting horizontal beams of the module roof structures, the facility roof structure having edges and the horizontal beams defining the edges which are supported by legs, the legs and the beams defining side areas, the side areas being covered by a shielding arrangement, the shielding arrangement of the side area comprising:
 elongated elements, and
 cover material, such as tarpaulin, being arranged between the elements and connected therewith,
wherein the on-site mobile facility further comprises a guide system for guiding the shielding arrangement of the side area, the guide system being slidably connecting the elements with one of the beams or the adjacent legs, so as to at least partly uncover the side areas, so that wind is allowed to pass through the facility by passing through the uncovered part of the side area and out through an uncovered part of the side area on another side of the on-site mobile facility to reduce the wind load on the facility in order for the facility to remain unaffected by the wind load during heavy winds.

The shielding arrangement covering the side area of each module may be connected directly to the legs carrying the roof structure.

Moreover, the side area may be the area of the module exposed to the highest wind load.

By having each side area covered by a separate shielding arrangement, the on-site mobile facility can be designed substantially as a more light-weight construction than known facilities, since the shielding arrangements can quickly by pulled up if the wind forces on the construction become too high. Thus, the facility construction does not have to be capable of withstanding wind pressure on all sides of the facility, as the shielding arrangement can be retracted and the wind allowed to flow underneath the facility. In known facilities, the whole side of the facility is covered by one tarpaulin. Consequently, the side cannot be easily removed, and the design of known facilities has to be stronger and thus more massive. When having a more light-weight design, the facility can be mounted with much smaller cranes, reducing mounting costs substantially. Furthermore, the facility, when built from modules, can be mounted several meters off the ground, e.g. above a building to be renovated or across a larger opening, such as when building a metro station where supporting legs in the middle of the facility is not an option.

By mounting the facility starting with a corner, the facility can be built off the ground, e.g. 30 meters off the ground covering an existing building. Furthermore, the facility can be mounted with smaller cranes, since the whole facility roof structure does not have to be hoisted in one piece. By using a smaller crane, the facility is less costly to mount than known facilities.

In addition, the elements of the shielding arrangement may be directly connected with the legs or beam carrying the roof structure.

Furthermore, the side area may be defined as delimited by two adjacent legs and a horizontal beam carrying the roof structure.

Thus, two adjacent legs and a horizontal beam carrying the roof structure may be presenting borders of the side area.

The on-site mobile facility as described above may further comprise a guide system slidably connecting the elements with one of the beams or the adjacent legs without any further frame structure there between.

Also, the shielding arrangement may have a shielding position in which the elements have a first mutual distance and an open position in which the elements have a smaller mutual distance than the first mutual distance in the shielding position, so that the wind is allowed to pass the uncovered side area in the second position.

Moreover, the guide system may comprise a motor for bringing the elements from a shielding position to an open position or vice versa.

In addition, the elements may be slidably connected with the beam or legs by a rail connection.

Also, the elements may have a tongue engaging a groove in the beam or legs.

The cover material may be divided into cover parts, each cover part being arranged between two adjacent elements.

Additionally, the shielding arrangement may have an outer face and an inner face facing an inside of the facility, at least a first cover part of the cover material being connected to the element at the outer face of the shielding arrangement and at least a second cover part of the cover material being connected to the element at the inner face of the shielding arrangement.

Furthermore, a space is formed between the first and second cover parts, which space may be fully or partly filled with sound-absorbing material, sound insulation, and/or layers of material having different properties.

Moreover, the cover material may be connected to grooves in the elements.

Furthermore, at least the element being furthest away from the beam may be connected with a hoist system by a hoisting means, such as a wireline, a cord or a chain, so that this element and the intermediate elements are hoisted by pulling in the hoisting means.

Further, the guide system may comprise a wind sensor.

The present invention also relates to an on-site mobile facility for shielding when constructing, renovating or assembling a building, a bridge or a wind turbine, the on-site mobile facility covering an area having boundaries and corners, comprising:
  a plurality of modules, each module having a module roof structure, the module roof structures being mounted as a facility roof structure connecting horizontal beams of the module roof structures, the facility roof structure having edges and the horizontal beams defining the edges which are supported by legs, and
  a crane, such as a traverse crane, suspended from the facility roof structure.

Said crane may be used for bringing the elements from a shielding position to an open position or vice versa.

Further, the motor or the crane may be operated by remote control.

The projecting flange structures may be in the same level of height, so that a crane is capable of travelling across the facility underneath the facility roof structure in a first direction and in a second direction perpendicularly to the first direction.

Additionally, the beams may be connected by corner blocks forming a squared grid structure.

Also, the corner blocks of the on-site mobile facility may further comprise projecting structures defining rails for a crane moving along the projecting structures.

The corner blocks may have a projecting flange structure forming part of the rails of the crane.

Moreover, projecting flanges structures may be suspended from the facility roof structure and connected with the beams, the projecting flanges or structure defining rails for a crane moving along the projecting structures or rails.

Further, the projecting structures may face downwards from the beams/corner blocks.

The projecting flange structure of the corner blocks may be in the same level of height as the projecting flange structures connected with the beams, so that a crane is capable of travelling across the facility underneath the facility roof structure in a first direction and in a second direction perpendicularly to the first direction.

Furthermore, rails for a crane may be integrated in the beams and the corner blocks so as to form a grid of rails so that the crane can travel in two perpendicular directions across the facility underneath the facility roof structure.

The on-site mobile facility as described above may further comprise grid beams connections connecting the joist connections.

The on-site mobile facility as described above may further comprise base structures adapted to be firmly fastened to or in a ground of the area, wherein the legs may be fastened to the base structures.

The present invention also relates to an on-site mobile facility for shielding when constructing, renovating or assembling a building, a bridge or a wind turbine, the on-site mobile facility covering an area having boundaries and corners, comprising:
  a plurality of modules, each module having a module roof structure, the module roof structures being mounted as a facility roof structure connecting horizontal beams of the module roof structures, the facility roof structure having edges and the horizontal beams defining the edges which are supported by legs, and
  base structures adapted to be firmly fastened to or in a ground of the area, wherein the legs are fastened to the base structures.

Also, each leg may be fastened to a base structure.

Said base structure may be partly submerged into the ground and covered by ground material.

Furthermore, each base structure may comprise a base plate which is substantially horizontal when arranged in a hole in the ground.

In addition, at least a first partition may be arranged perpendicularly to the base plate in a raised position.

The first partition may be arranged at least partly in the ground.

Moreover, the base structure may further comprise a second partition connected with the base plate and arranged perpendicularly to the first partition and perpendicularly to the base plate.

The first and second partitions may be adapted to be arranged at least partly in the ground.

By having partitions arranged at least partly in the ground, the ground material is divided by the partitions, and when the wind pulls in the facility, the forces acting on the facility are distributed to the base structure and the ground. Consequently, the forces can only move the facility, if the ground material is also moved.

Further, the second cover material may have a curved shape when the pyramidal roof structure is unfolded.

The joists may be connected in a joist connection and the second cover material may have a tip connected with the joist connection by means of a rod creating a distance between the joists and the cover material.

Moreover, the second cover material may constitute the roof of each module.

Furthermore, the first ends of each joist of the pyramidal roof structure may be fastened to one of the corner blocks.

The on-site mobile facility as described may further comprise a lifting beam for hoisting the beam down between two adjacent legs for aligning the legs to have a mutual distance between them matching a length of the beam.

Said lifting beam may comprise two sets of control wheels for engaging the legs between which legs the beam is to be mounted.

The legs may each comprise a control pin arranged in a top part of the legs facing upwards when mounted in an upright position.

The present invention also relates to a facility mounting method for mounting the on-site mobile facility according to any of the preceding claims at a site and covering an area having boundaries and corners, comprising the steps of:
arranging a plurality of base structures in holes at predetermined locations at the site along the boundaries,
fastening a leg to each of the base structures being part of one of the corners,
raising the beams,
fastening each beam to the two adjacent legs by means of corner blocks,
fastening two beams so that a first end of one of the two beams is fastened to the corner block of one of the legs adjacent the leg in the corner, and a first end of the other of the two beams is fastened to the corner block of another one of the legs adjacent the leg in the corner, and fastening second ends of the beams to each other by means of a corner block which is unsupported by a leg, thereby forming a square frame of beams in the corner,
suspending a crane to projecting structures suspended from the beams and/or corner blocks defining rails for the crane moving along the rails,
unfolding a pyramidal roof structure consisting of joists having a first end and a second end,
fastening a pyramidal roof structure consisting of joists having a first end and a second end, the first ends being connected to the square frame of beams and the second ends of the joists being connected to each other in a joist connection,
fastening further beams to legs adjacent the corner,
fastening further beams forming square frames of beams, and
fastening further pyramidal roof structures to the beams.

In the above facility mounting method, the step of raising the beam may comprise the step of hoisting the beam down by means of a lifting beam so that control wheels of the lifting beam engage control pins of the corner block to align the mutual distance between the legs to match a length of the beam to be mounted there between.

Said facility mounting method may further comprise the step of installing the guide system to the legs/beam.

Also, the facility mounting method described above may further comprise the step of fastening the elements with cover material to the legs/beam and connecting the elements to the guide system.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
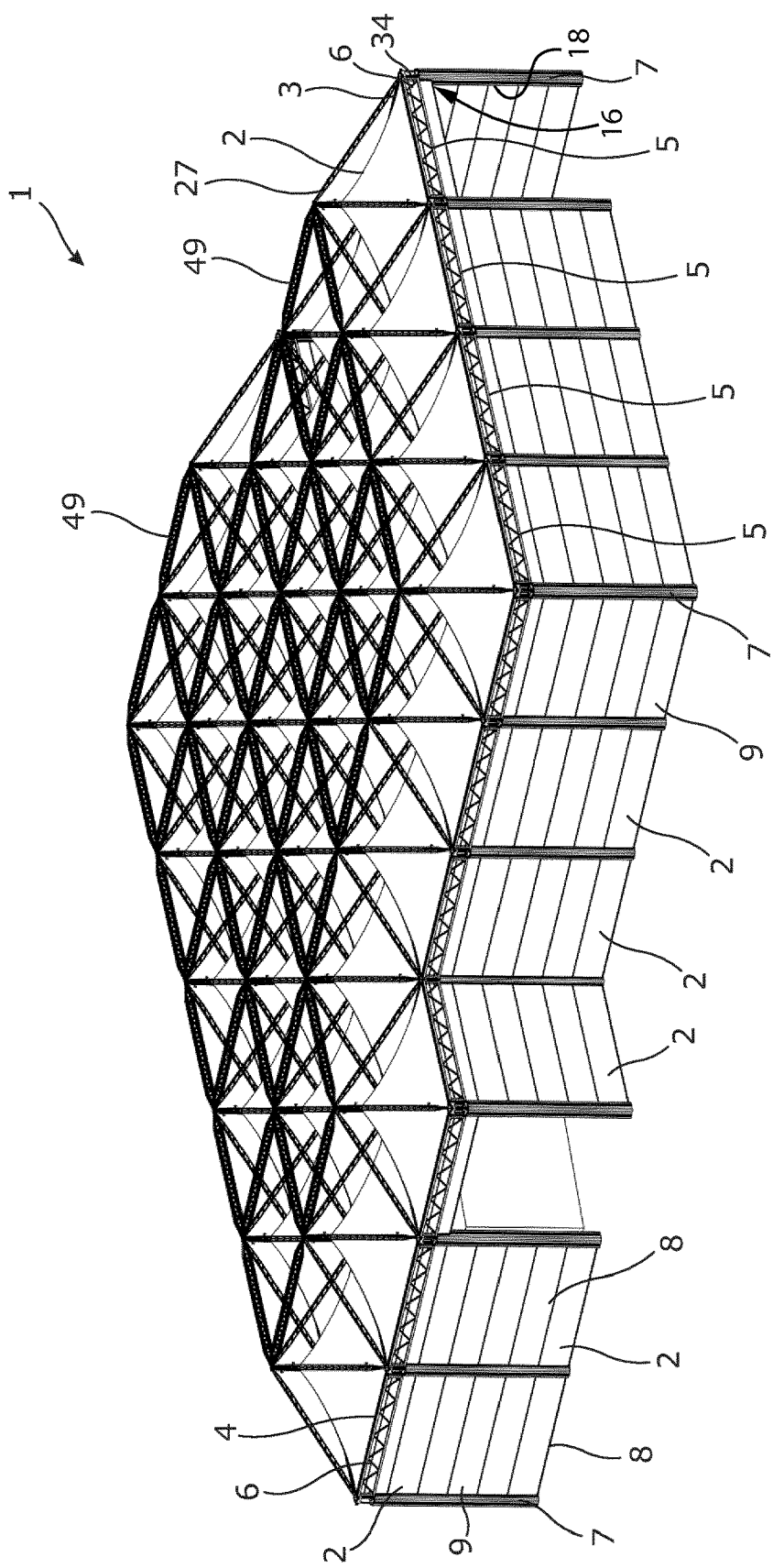
FIG. 1 shows a perspective of an on-site mobile facility according to the invention.
Figure 1A:
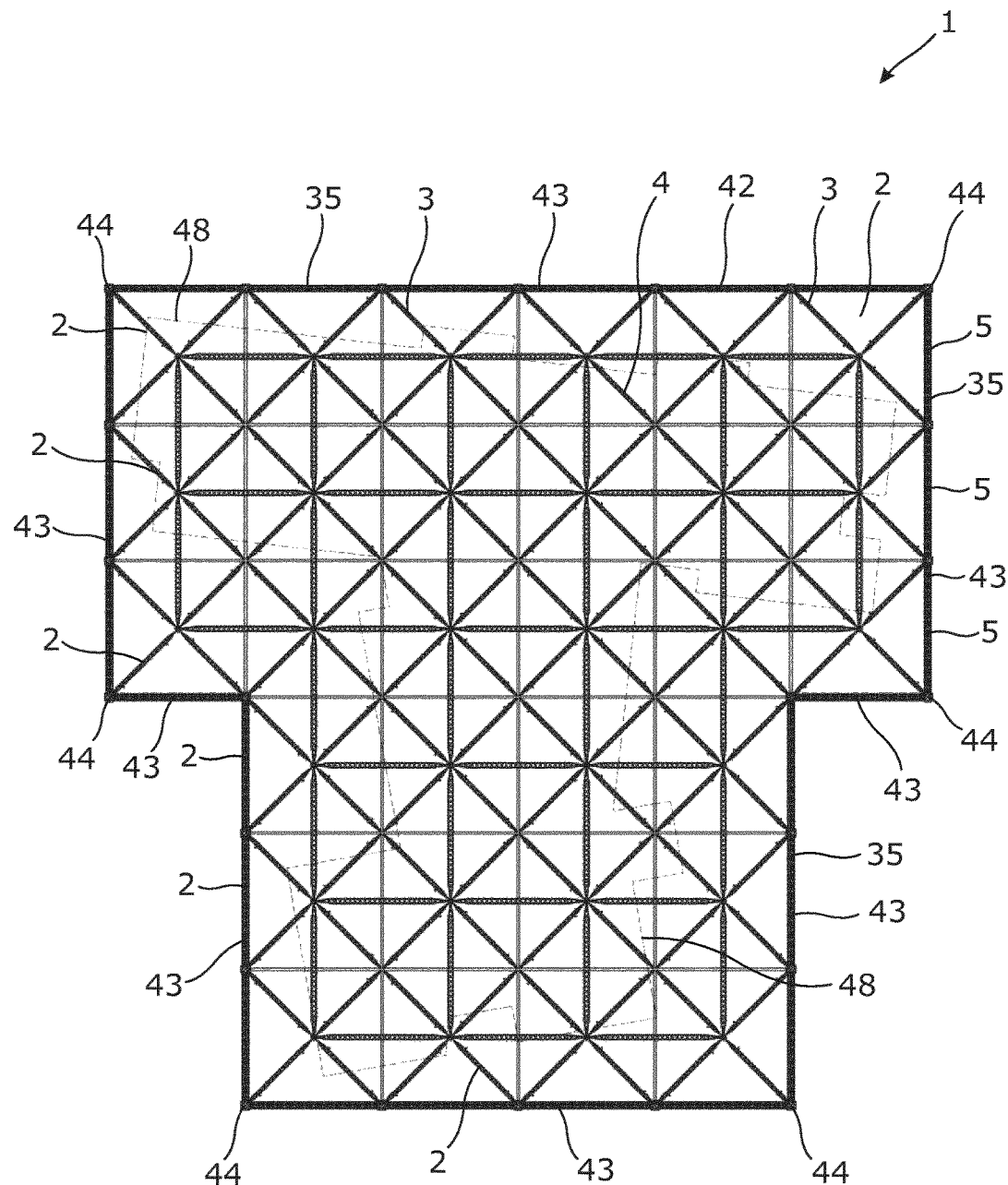
FIG. 1A shows the on-site mobile facility of FIG. 1 seen from above.

FIG. 1 shows an on-site mobile facility 1 for constructing, renovating or assembling a large element, such as building, a bridge or a wind turbine. In order to provide a production facility when constructing, renovating or assembling such a large element, the on-site mobile facility covers an area large enough for such work to be carried out. The on-site mobile facility may be used when preparing an opening in the ground for an underground railway station or when mounting all the elements and platforms for a large bridge, e.g. bridging between Denmark and Germany. Due to the construction as explained below, the on-site mobile facility is able to cover large areas or buildings without having intermediate ground contact in the middle of the facility. As shown in FIG. 1A, the area 42 has boundaries 43 and corners 44, as the facility is primarily built from squares forming a squared grid structure 35. The on-site mobile facility 1 covers a building 48 to be renovated without having contact with the building. The on-site mobile facility is also mobile, defined in that the facility is a light-weight construction which is easy to dismount and set up at another location.

The on-site mobile facility 1 comprises a plurality of modules 2 as shown in FIGS. 1 and 1A, which, mounted together, form the on-site mobile facility 1. The module roof structures 3 are mounted together, connecting horizontal beams 5 of the module roof structures to form a facility roof structure 4. Each module 2 has a module roof structure 3 which is square-shaped when seen from above in FIG. 1A, and as can be seen in FIG. 1, the facility roof structure has edges 6, and the beams 5 defining the edges are supported by legs 7 resting on the ground. The legs 7 and the beams 5 define side areas 8 of each module, and the side areas are covered by a shielding arrangement 9.

By a side area is meant the face of the module being substantially horizontal and the face of each module exposed to the highest wind load. Thus, the roof structure is also exposed to wind load, but to less than 50% of the wind load compared to the side area. Each side area is defined as the area of each module between two legs of the main structure of the module. The shielding arrangement covering the side area of each module is connected directly to the legs carrying the roof structure.

Figure 2:
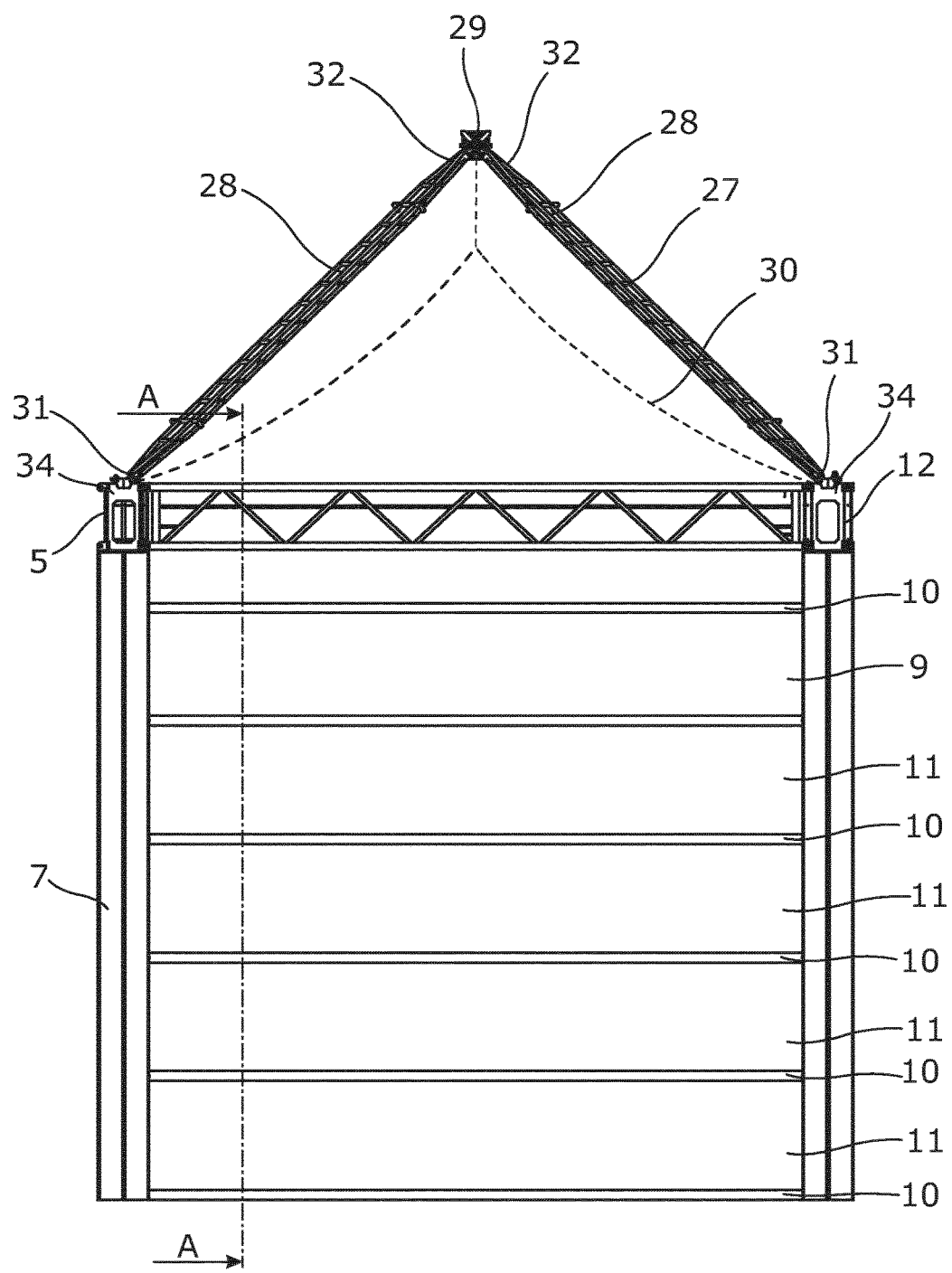
FIG. 2 shows a side view of a module of the on-site mobile facility.
Figure 3:
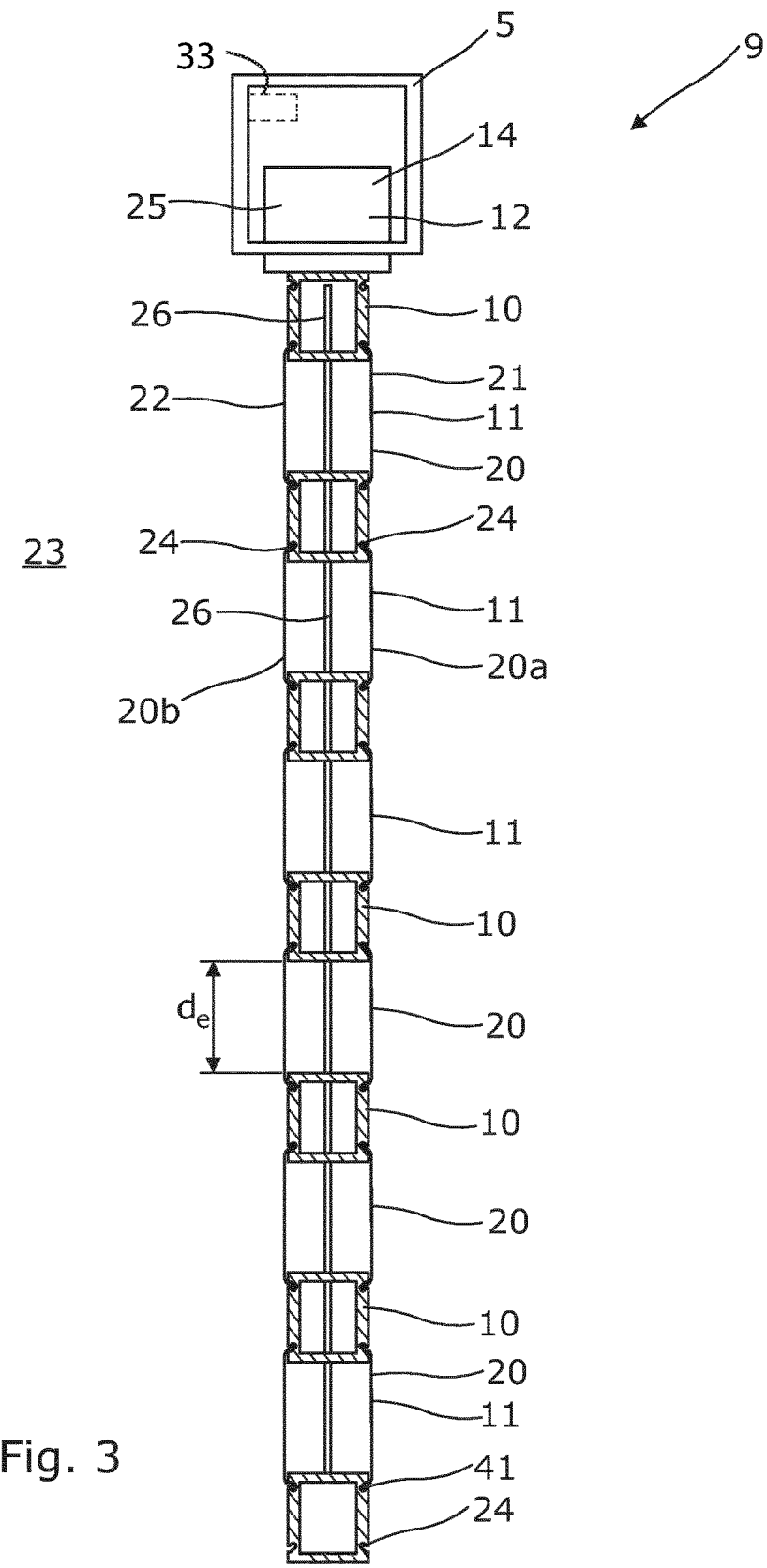
FIG. 3 shows a cross-sectional view of FIG. 2.
Figure 11:
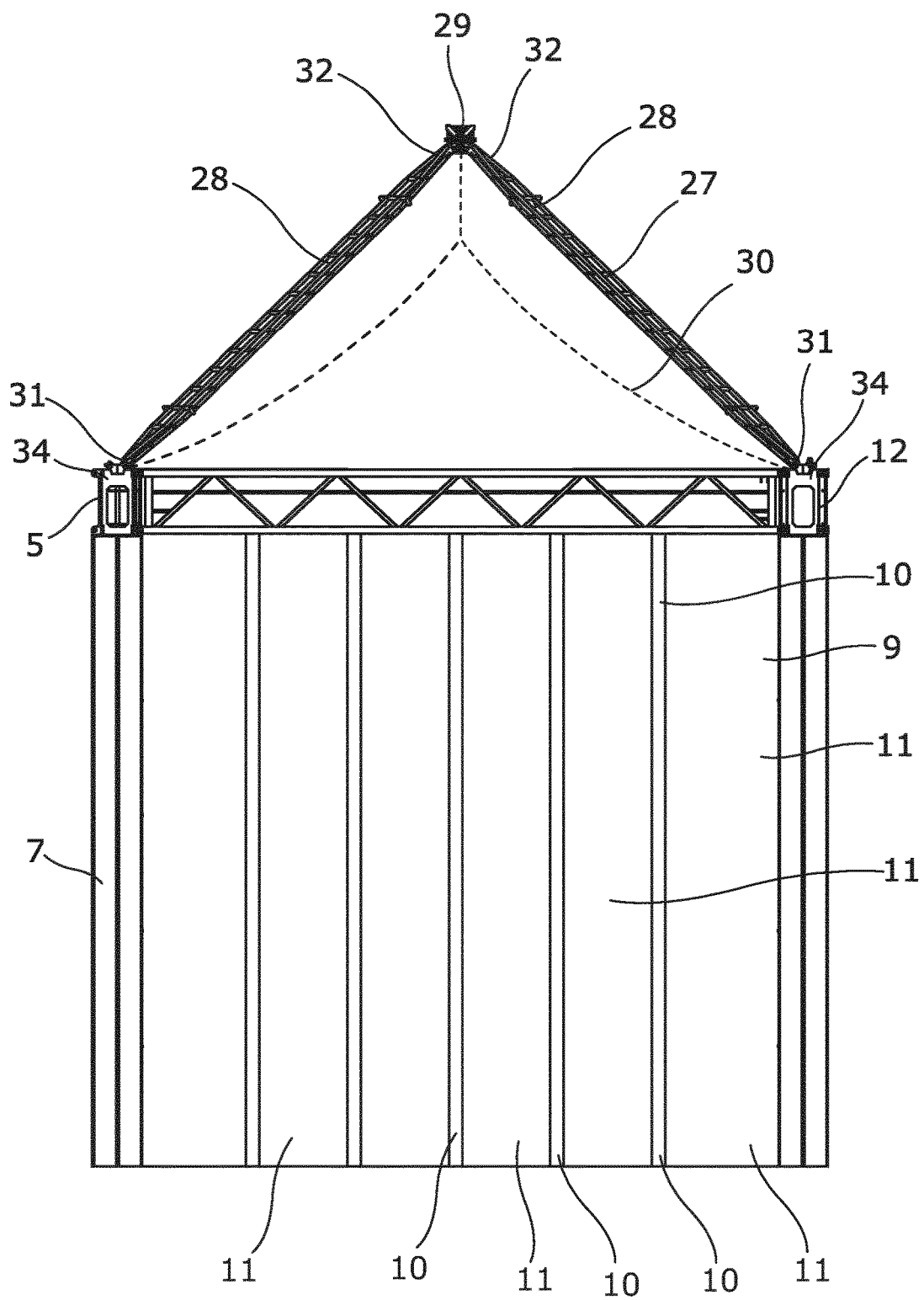
FIG. 11 shows elements of the shielding structure being slidably connected to the beam.

One module of the on-site mobile facility 1 is shown in a front view in FIG. 2. As shown in FIGS. 2 and 3, the shielding arrangement 9 of the side area comprises elongated elements 10, and cover material 11, such as tarpaulin, is arranged between the elements and connected therewith. The on-site mobile facility further comprises a guide system 12 slidably connecting an end of the elements with one of the beams 5 or the adjacent legs 7; however, the elements of the shielding structure are directly connected to the legs or the horizontal beam carrying the roof structure. In FIGS. 1 and 2, the elements are arranged in a slidable arrangement, so that the elements are able to slide up and down and bring the shielding arrangement up or down. The ends of the elements are sliding in rails in the legs. In FIG. 1, two side areas are shown with the shielding arrangement up, and the remaining visible side areas are shown with the shielding arrangement down. As shown in FIG. 11, the ends of the elements can also be sliding in rails in the beam, and thus the elements are in an upright position.

The guide system 12 of the on-site mobile facility is slidably connecting the elements with one of the beams 5 (shown in FIG. 11) or the adjacent legs 7 (shown in FIG. 2), and no further frame structure is arranged there between. The elements are slidably connected with the beam or legs by a rail connection 16 or just rails in the beam or legs. The rail connection may be formed by the legs having a groove 18 and the elements having a projection or tongue sliding in the groove, or vice versa. Thus, a very simple facility or construction is obtained which is easy to mount and dismount, when the facility is to be used elsewhere or if a storm is coming, to uncover part of the side area so that the wind can enter through the on-site mobile facility and out through another uncovered side area of the on-site mobile facility. The shielding arrangement in each side area can easily be pulled up by a motor of the guiding system 12, as shown in FIG. 3, or slid aside if the elements are connected to the beam, for bringing the elements from a shielding position to an open position to let the wind through the facility and thus minimise the wind impact or wind load on the construction. The guide system comprises a motor 14 which motor 14 is fastened to the element furthest away from the beam 5 which is also the lowest element. The guide system further comprises a hoist system 25 having a hoisting means 26. The element is connected with the hoist system 25 by the hoisting means 26, such as a wireline, a cord or a chain, so that this element and the intermediate elements are hoisted by pulling in the hoisting means, which in FIG. 3 is performed by the motor.

As shown in FIG. 3, the cover material 11 is divided into cover parts 20, each cover part being arranged between two adjacent elements 10. The shielding arrangement 9 of the side areas has an outer face 21 and an inner face 22 facing an inside 23 of the facility. A first cover part 20*a* of the cover material is connected to the element at the outer face 21 of the shielding arrangement 9, and a second cover part 20*b* of the cover material is connected to the element at the inner face of the shielding arrangement 9. Each of the cover parts of the cover material is connected to grooves 24 in the elements 10, each cover part having a side edge 41 matching the groove of the element, so that the cover parts can be fastened in the elements.

In the shielding position shown in FIG. 3, the elements have a first mutual distance $d_e$, and when arranged in an open position, the elements have a mutual distance which is smaller than the first mutual distance in the shielding position. If the shielding arrangement is pulled fully upwards, so that the side areas are fully open, the elements 10 abut each other as the motor pulls the lowest element upwards, the other elements being pulled along with it.

Figure 4:
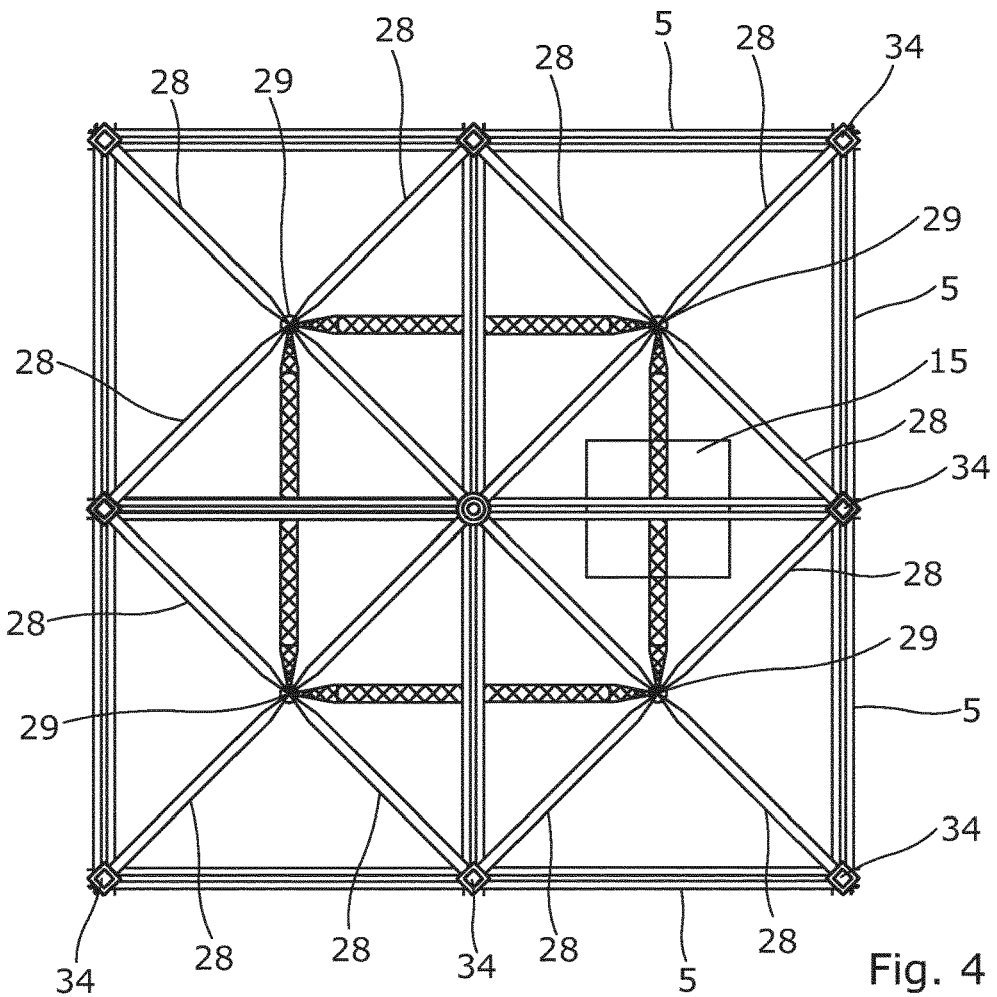
FIG. 4 shows four module roof structures mounted into a facility roof structure seen from below.
Figure 4A:
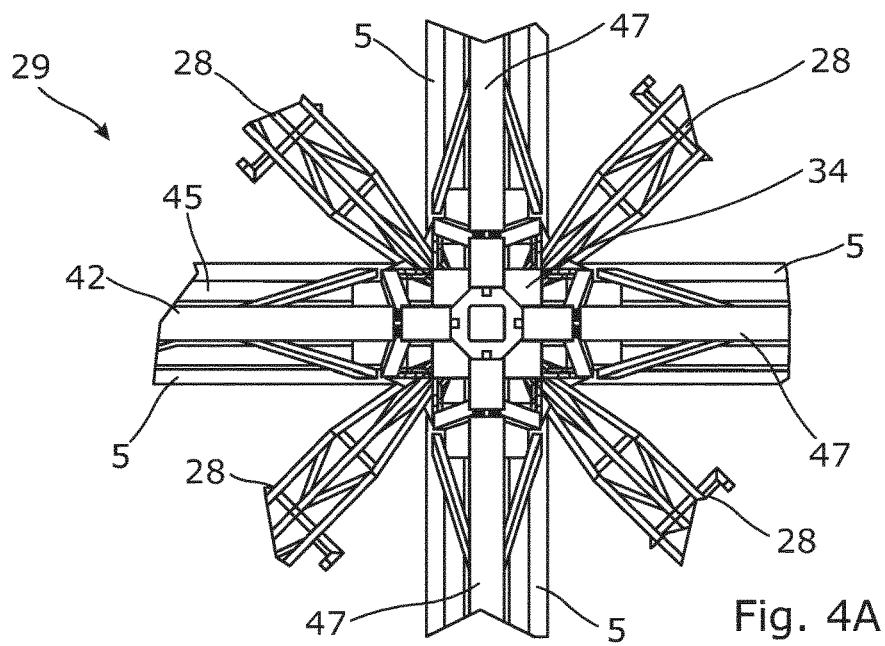
FIG. 4a shows an enlarged, partial view of FIG. 4.

Returning to FIG. 2, each module of the on-site mobile facility comprises a pyramidal roof structure 27 consisting of joists 28 having a first end 31 and a second end 32. The first ends are connected to the beams 5 and the second ends of the joists are connected to each other in a joist connection 29 as seen in FIGS. 4 and 4A. The beams are connected by corner blocks 34 forming a squared grid structure 35 as shown in FIG. 1A, and the joists 28 may be connected to the corner blocks 34 instead of directly to the beams as shown in FIG. 4A. The corner block 34 is constructed so that beams 5, legs 7 as well as joists 28 can be mounted thereto.

Figure 5:
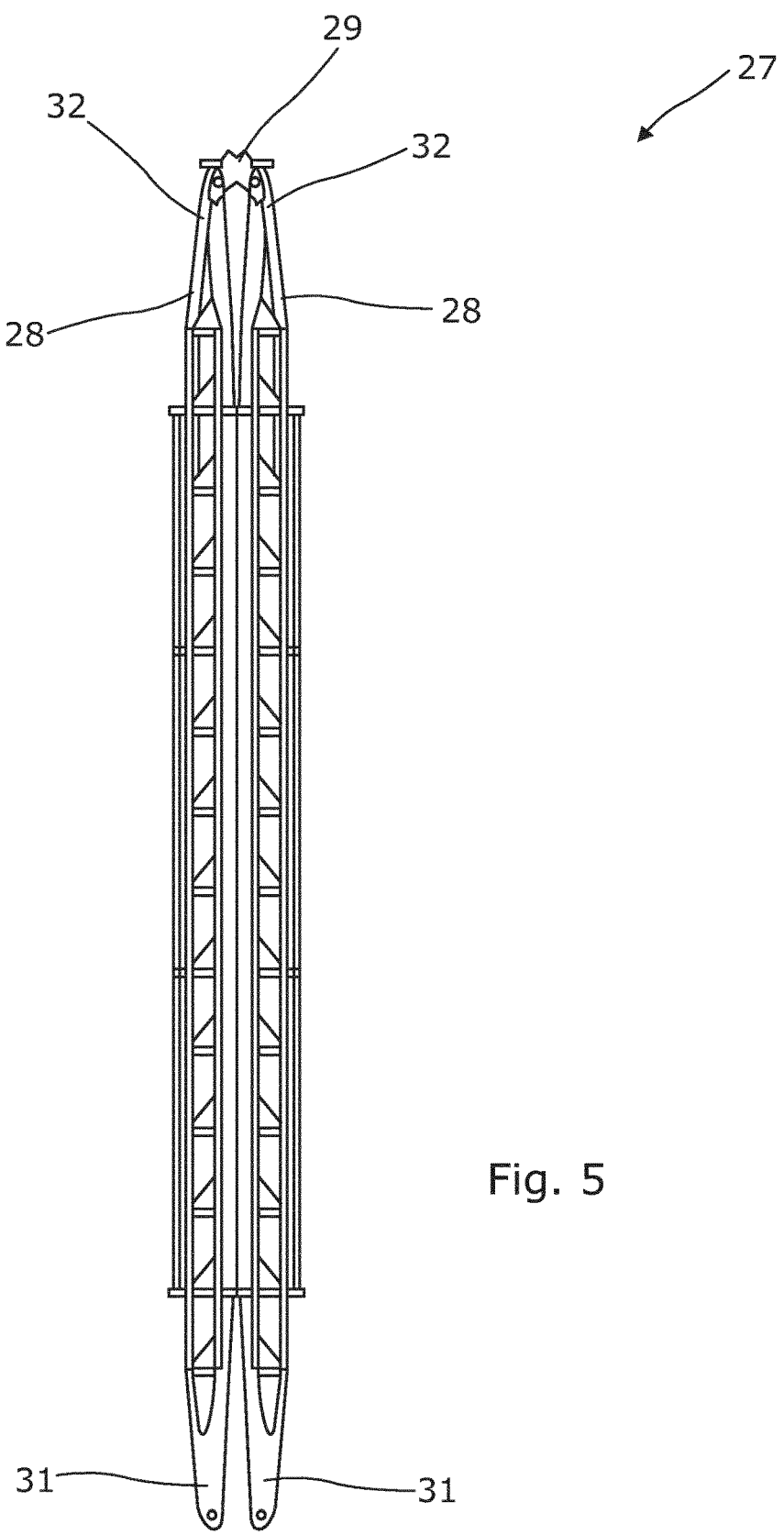
FIG. 5 shows a folded pyramidal roof structure.
Figure 6:
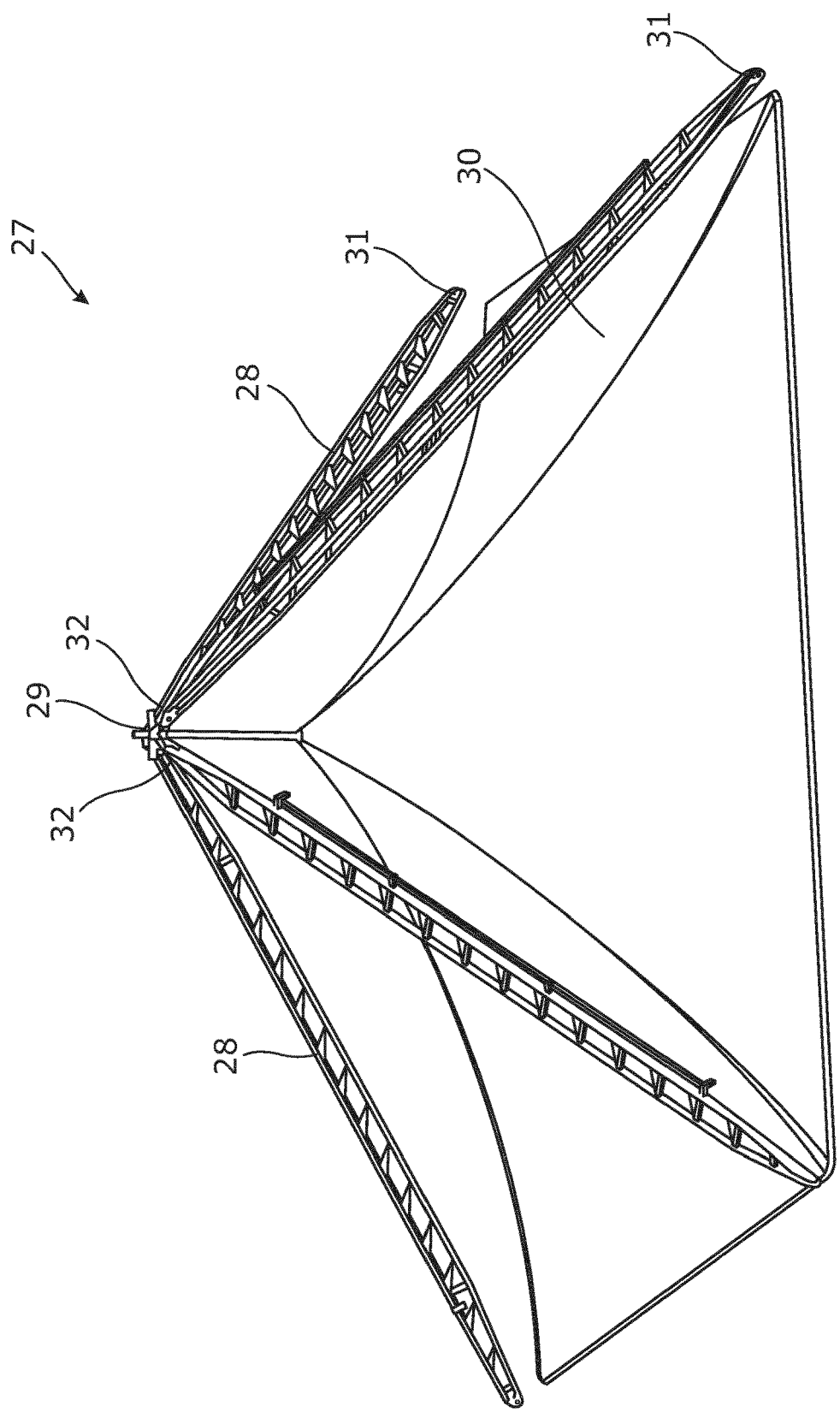
FIG. 6 shows an unfolded pyramidal roof structure.

As shown in FIG. 5, the second ends 32 of the joists 28 are hingedly connected in the joist connection 29, so that the pyramidal roof structure is unfoldable as shown in FIG. 6. In FIG. 6, a second cover material 30 is connected with the joist connection and the beams (not shown). The second cover material 30 constitutes the roof of each module so that wind, water, snow and ice are prevented from entering the facility. The second cover material 30 is connected with the beam so that water is flowing along cover material 30 and into a roof gutter 45 (shown in FIG. 4A) which is a part of the beam 5.

The beams 5 and the corner blocks 34 of the on-site mobile facility further comprise projecting structures 47, as shown in FIG. 4A, so that the projecting structures define rails for a crane moving along the rails. Thus, the projecting structures 47 are suspended from the facility roof structure and form part of or are connected with the beams 5. In this way, a crane 15, shown in FIG. 4, is capable of moving along the beams not forming part of the boundaries of the facility roof structure. The projecting flange structures of the beams and the corner blocks may be in the same level of height, so that a crane is capable of travelling across the facility underneath the facility roof structure in a first direction and in a second direction perpendicularly to the first direction. The crane can change direction at the corner block to a direction perpendicular thereto. Furthermore, the rails for the crane may be integrated in the beams and the corner blocks so as to form a grid of rails, so that the crane can travel in two perpendicular directions across the facility underneath the facility roof structure.

The crane 15 may be a traverse crane suspended from the facility roof structure. The aforementioned motor for pulling up the shielding arrangement 9 may be replaced by the crane which could be operating most of the shielding arrangements for moving them between an open, a partly open and shielding position. Both the motor and the crane may be remotely controlled, so that the facility manager, when hearing of storm or high winds, can send a control signal to the crane and/or motors to bring up the shielding arrangements. The guide system may further comprise a wind sensor 33 and thus be self-operable if excessive winds are measured by the sensor, as the sensor thus sends a signal to the motors and/or crane to pull up the shielding arrangement.

As shown in FIG. 1, the on-site mobile facility 1 may comprise further grid beams 49 connecting the joist connections and thus connecting the module roof structures 3 and thus the modules 2, strengthening the stability of the on-site mobile facility 1. The stability of the on-site mobile facility 1 is mainly gained from the corner blocks being rigid and capable of handling a high torque and the crossing in the pyramidal roof structure 27, but the grid beams may also provide some stability to the facility construction.

Figure 7A:
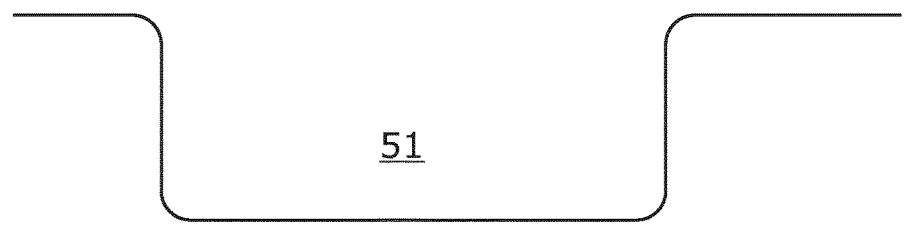
FIG. 7A shows a hole in the ground.
Figure 7B:
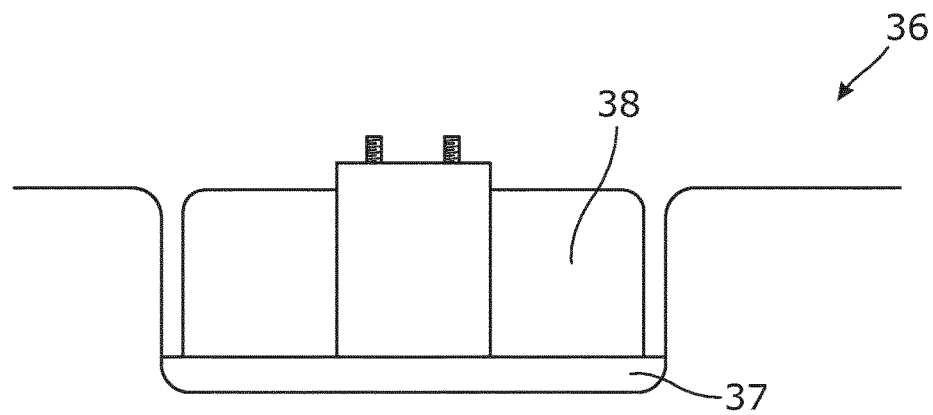
FIG. 7B shows a base structure arranged in the hole of FIG. 7A.

When mounting the on-site mobile facility 1 at a certain location above a building as shown in FIG. 1A, base structures 36, shown in FIGS. 7A and 7B, are first firmly fastened to or in the ground, e.g. the base structure is partly submerged into the ground and covered by ground material. Returning to FIG. 1, the legs are then raised by means of a crane, and a leg is fastened by means of a corner block 34 to each of base structures being part of one of the corners 44 of the area 42, as shown in FIG. 1*a*. Subsequently, two beams are fastened so that a first end of one of the two beams is fastened to one of the legs forming the corner, and a first end of the other of the two beams is fastened to another of the legs forming the corner. Then the second ends of the beams are fastened to each other by means of a corner block, thereby forming a square frame of beams in the corner, so that one corner block is not supported by a leg. Subsequently, the pyramidal roof structure 27 is raised up and fastened to the corner blocks to aid in the support of the "free" and unsupported corner. Subsequently or simultaneously, further legs adjacent the corner are fastened to the base structures and further beams are fastened in a grid frame of beams extending from the first module roof structure, and further pyramidal roof structures are fastened to the beams. By mounting the facility starting with a corner, the facility can be built off the ground, e.g. 30 meters off the ground, covering an existing building. Furthermore, the facility can be mounted with smaller cranes, since the whole facility roof structure does not have to be hoisted in one piece. By using a smaller crane, the facility is less costly to mount than known facilities.

Figure 7C:
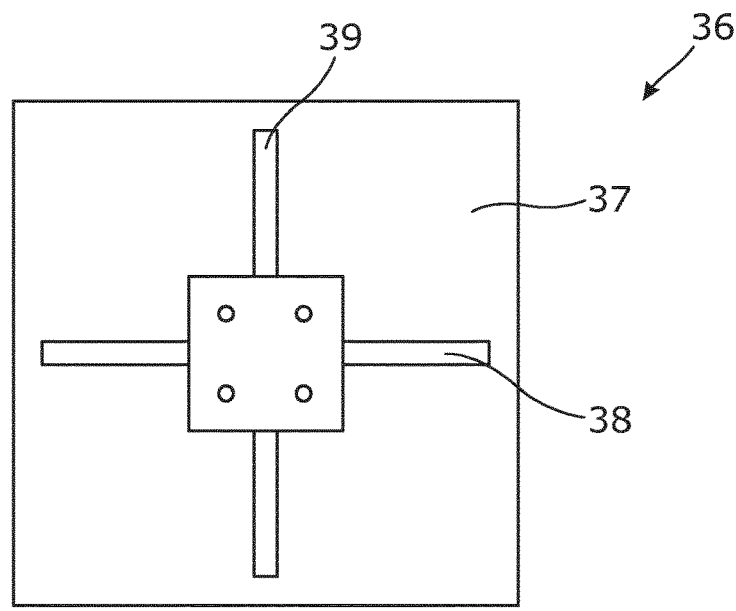
FIG. 7C shows the base structure of FIG. 7B from above.

The base structure 36 shown in FIG. 7C comprises a base plate 37 which is substantially horizontal when arranged in a hole 51 (shown in FIG. 7A) in the ground, as shown in FIG. 7B. A first partition 38 is arranged perpendicularly to the base plate in a raised position, and a second partition 39 is connected with the base plate and is arranged perpendicularly to the first partition and perpendicularly to the base plate. The first and second partitions are arranged at least partly in the ground, since after the base structure has been arranged in the hole 51, ground material is filled into the hole on top of the base structure. By having partitions arranged at least partly in the ground, the ground material is divided by the partitions, and when the wind pulls in the facility, the forces acting on the facility are distributed to the base structure and the ground. Consequently, the forces can only move the facility, if the ground material is also moved.

Figure 8:
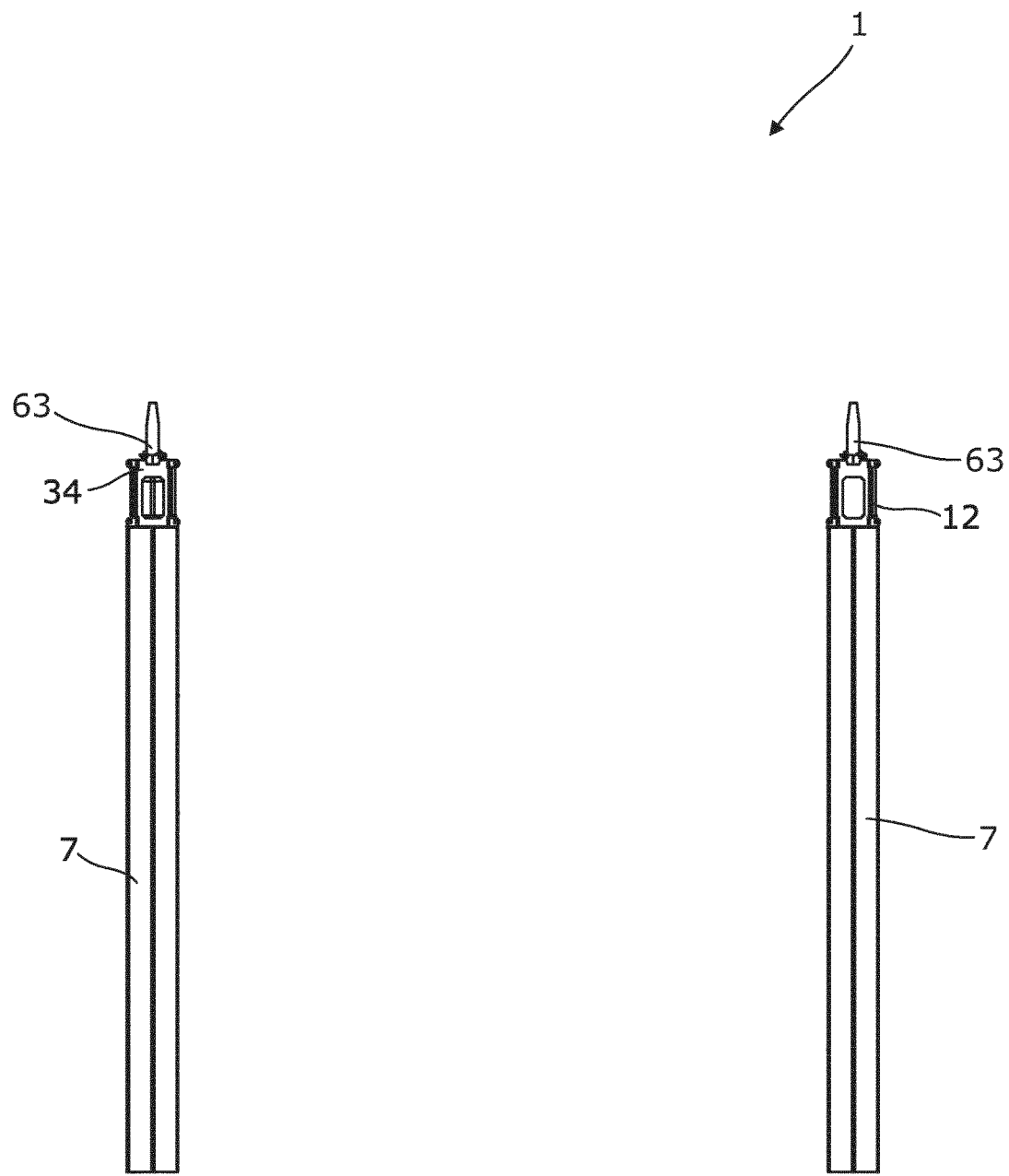
FIG. 8 shows two adjacent legs to be mounted as an on-site mobile facility.
Figure 9:
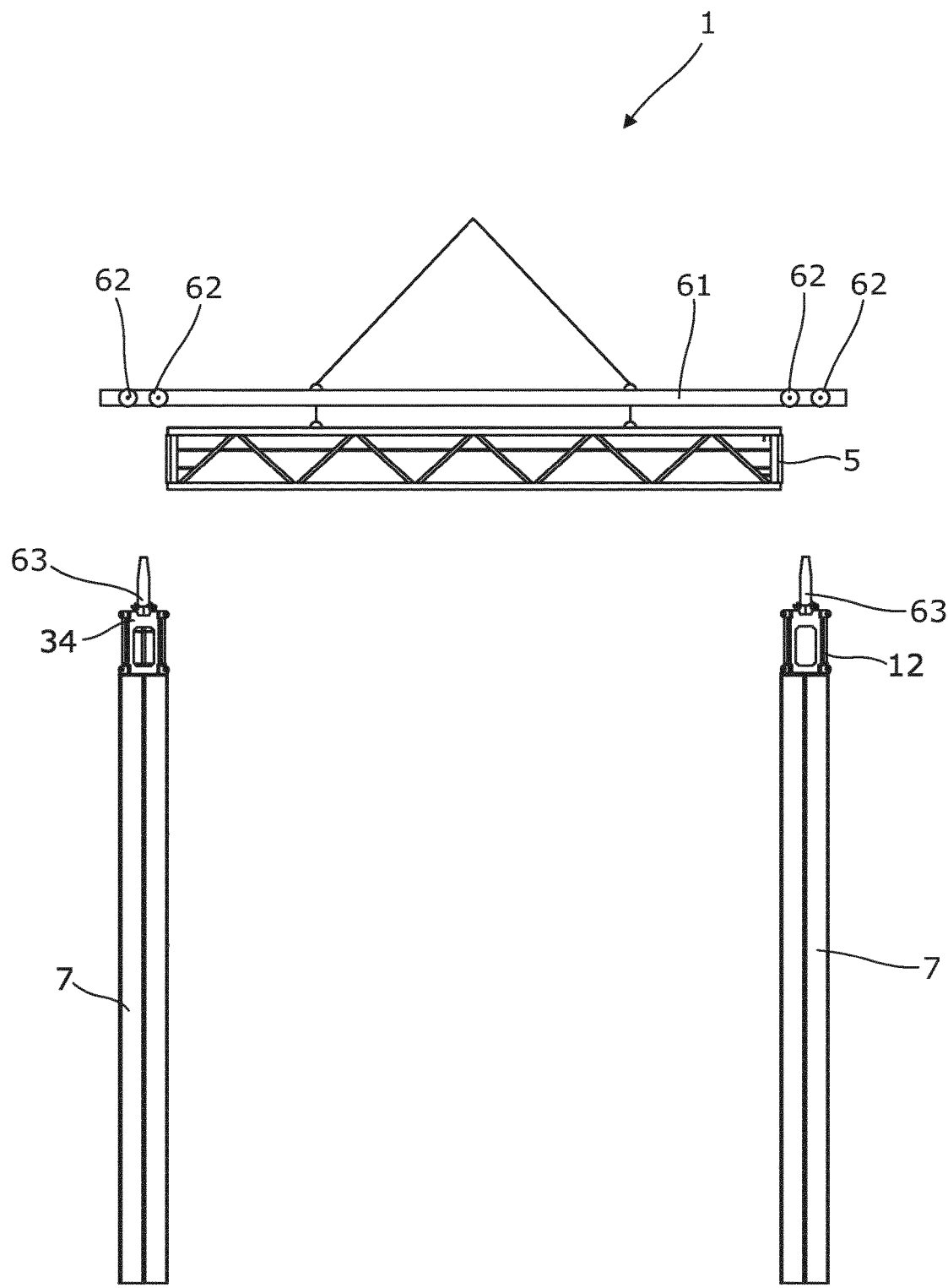
FIG. 9 shows a horizontal beam which is carried by a lifting beam ready to mount onto the legs.
Figure 10:
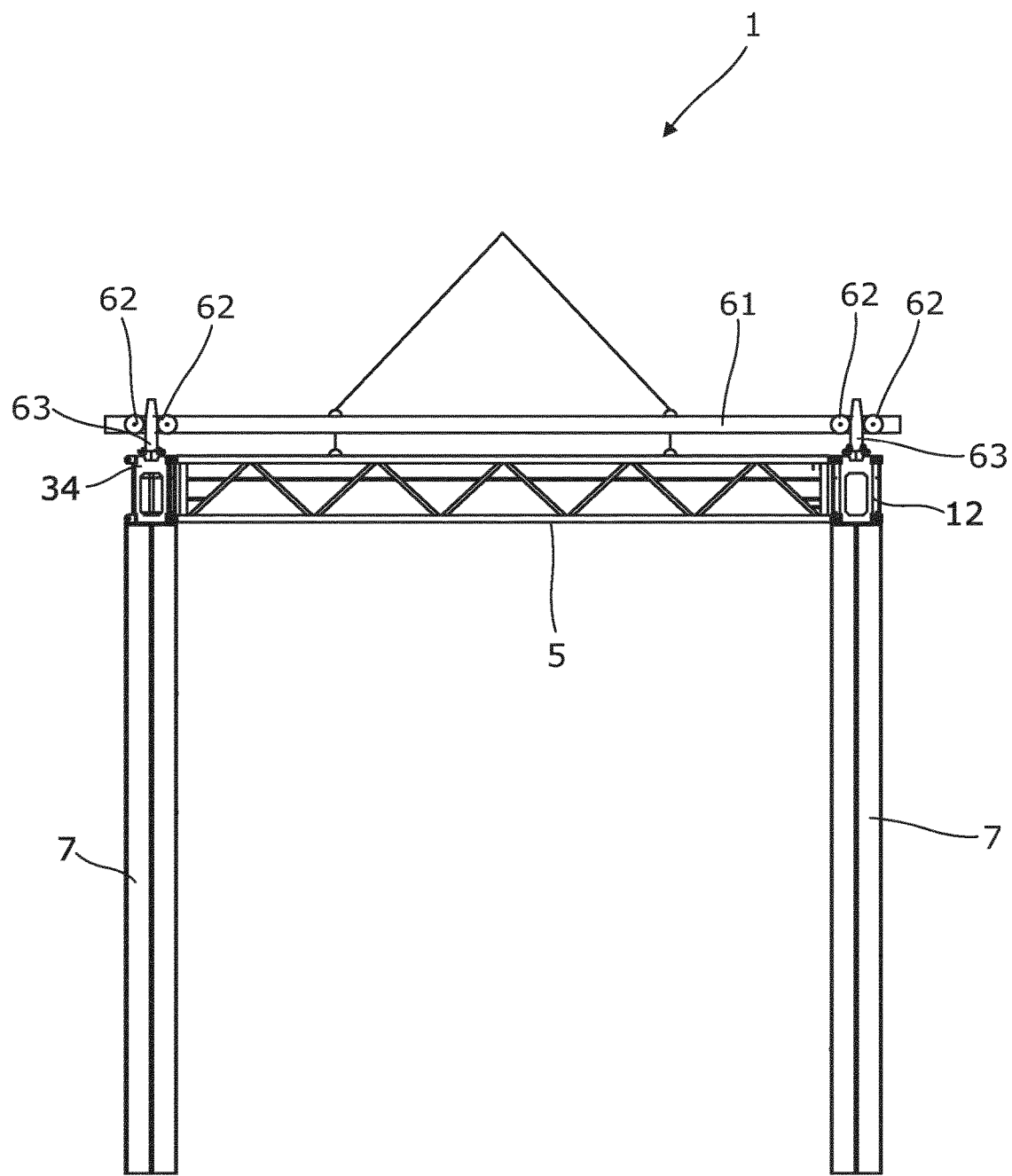
FIG. 10 shows a horizontal beam of FIG. 9 being mounted between two legs.

FIGS. 8-10 disclose how the horizontal beam 5 is installed and mounted to two adjacent legs 7 of the on-site mobile facility 1. FIG. 8 shows two legs 7 mounted on the ground at a distance from each other, said distance matching the length of the horizontal beam. However, the legs 7 may have a natural deflection and may therefore deflect along the length of the legs, and this may result in the mutual distance at the top of the legs being different from the length of the horizontal beam. And during mounting of the horizontal beam, it is thus not enough just to lower the beam down between the two legs, since it may then be almost impossible to nail the beam to the legs 7, especially due to the fact that this has to be done at a height of 10-20 meters off the ground where it is not possible to swing a sledgehammer. In FIG. 9, the horizontal beam 5 is lifted down in between the legs by means of a lifting beam 61 hoisted down by a mobile crane (not shown). The lifting beam 61 comprises two sets of control wheels 62, the two wheels in one set being arranged at a predetermined distance from each other. Each corner block 34 comprises, in the end part facing upwards, a control pin 63 for controlling the legs while mounting the horizontal beam 5. In FIG. 10, the lifting beam 61 is lowered down onto the control pins 63, so that the control wheels 62 of each set rotate around the control pin 63. In this way, the legs 7 are aligned to have a mutual distance matching the length of the horizontal beam 5. By having the lifting beam having control wheels rolling along the control pins of the legs, the legs are aligned to have a mutual distance matching the length of the beam, and thus nailing and thus fastening of the beam to the legs is easily done. Thus, the lifting beam 61 comprises a set of control wheels, the two sets having a mutual distance matching the distance between the two control pins of the legs so that the legs have a mutual distance matching the length of the beam. The set of control wheels is adjustable along the length of the lifting beam if needed.

Although the invention has been described in the above in connection with preferred embodiments of the invention, it will be evident for a person skilled in the art that several modifications are conceivable without departing from the invention as defined by the following claims.

The invention claimed is:

1. An on-site mobile facility for shielding from wind exerting a wind load on the facility, rain or snow when constructing, renovating or assembling a building, a bridge or a wind turbine, the on-site mobile facility covering an area having boundaries and corners, comprising:
   a plurality of modules, each module having a module roof structure, the module roof structures being mounted as a facility roof structure connecting horizontal beams of the module roof structures, the facility roof structure having edges and the horizontal beams defining the edges which are supported by legs,
   the legs and the horizontal beams defining side areas, the side areas being covered by a shielding arrangement, the shielding arrangement of the side areas comprising:
   elongated elements, and
   cover material arranged between the elongated elements and connected therewith,
   wherein the on-site mobile facility further comprises a guide system for guiding the shielding arrangement of the side areas, the guide system slidably connecting the elongated elements with one of the horizontal beams or adjacent legs so as to at least partly uncover at least a first side area of the side areas, so that wind is allowed to pass through the facility by passing through the uncovered part of the first side area and out through an uncovered part of a second side area of the side areas on another side of the on-site mobile facility to reduce the wind load on the facility.

2. An on-site mobile facility according to claim 1, wherein the shielding arrangement has a shielding position in which the elongated elements have a first mutual distance and an open position in which the elongated elements have a smaller mutual distance than the first mutual distance in the shielding position, so that the wind is allowed to pass in the open position.

3. An on-site mobile facility according to claim 1, wherein the guide system comprises a motor for bringing the elongated elements from a shielding position to an open position or vice versa.

4. An on-site mobile facility according to claim 1, wherein the elongated elements are slidably connected with a horizontal beam or legs by a rail connection.

5. An on-site mobile facility according to claim 1, wherein the cover material is divided into cover parts, each cover part being arranged between two adjacent elements.

6. An on-site mobile facility according to claim 1, wherein the shielding arrangement has an outer face and an inner face facing an inside of the facility, at least a first cover part of the cover material being connected to the elongated elements at the outer face of the shielding arrangement and at least a second cover part of the cover material being connected to the elongated elements at the inner face of the shielding arrangement.

7. An on-site mobile facility according to claim 1, wherein the cover material is connected to grooves in the elongated elements.

8. An on-site mobile facility according to claim 1, wherein at least the elongated element being furthest away from the horizontal beam is connected with a hoist system by a hoist line so that the elongated element and the intermediate elements are hoisted by pulling in the hoist line.

9. An on-site mobile facility according to claim 1, further comprising projecting flange structures suspended from the facility roof structure and connected with the horizontal beams, the projecting flange structures defining rails for a crane moving along the rails.

10. An on-site mobile facility according to claim 1, further comprising base structures adapted to be firmly fastened to or in a ground of the area, wherein the legs are fastened to the base structures.

11. An on-site mobile facility according to claim 1, wherein the horizontal beams are connected by corner blocks forming a squared grid structure.

12. An on-site mobile facility according to claim 1, further comprising projecting flange structures suspended from the facility roof structure and connected with the horizontal beams, the projecting flange structures defining rails for a crane moving along the projecting flange structures or rails.

13. An on-site mobile facility according to claim 9, wherein the projecting flange structures face downwards from the horizontal beams and/or corner blocks.

14. An on-site mobile facility according to claim 10, wherein each base structure comprises a base plate which is substantially horizontal when arranged in a hole in the ground.

15. An on-site mobile facility according to claim 1, further comprising a lifting beam for hoisting the horizontal beam down between two adjacent legs for aligning the legs to have a mutual distance between them matching a length of the horizontal beam.

16. An on-site mobile facility according to claim 15, wherein the lifting beam comprises two sets of control wheels for engaging the legs between which legs the horizontal beam is to be mounted.

17. A facility mounting method for mounting the on-site mobile facility according to claim 1 at a site and covering an area having boundaries and corners, comprising:
arranging a plurality of base structures in holes at predetermined locations at the site along the boundaries,
fastening a leg to each of the base structures being part of one of the corners,
raising the horizontal beams,
fastening each horizontal beam to two adjacent legs via corner blocks,
fastening two horizontal beams so that a first end of one of the two beams is fastened to the corner block of one of the legs adjacent a leg in the corner, and a first end of the other of the two horizontal beams is fastened to the corner block of another one of the legs adjacent the leg in the corner, and fastening second ends of the horizontal beams to each other via a corner block which is unsupported by a leg, thereby forming a square frame of horizontal beams in the corner,
suspending a crane to projecting structures suspended from the horizontal beams and/or corner blocks defining rails for the crane moving along the rails,
unfolding a pyramidal roof structure including joists having a first end and a second end,
fastening a pyramidal roof structure including joists having a first end and a second end, the first ends being connected to the square frame of horizontal beams and the second ends of the joists being connected to each other in a joist connection,
fastening further horizontal beams to legs adjacent the corner,
fastening further horizontal beams forming square frames of horizontal beams, and
fastening further pyramidal roof structures to the horizontal beams.

18. A facility mounting method according to claim 17, wherein the raising the horizontal beams comprises hoisting each said beam down via a lifting horizontal beam so that control wheels of the lifting horizontal beam engage control pins of the corner block to align the mutual distance between the legs to match a length of the horizontal beam to be mounted there between.

19. A facility mounting method according to claim 17, further comprising installing the guide system to the legs and/or beams.

20. A facility mounting method according to claim 17, further comprising fastening the elongated elements with the cover material to the legs and/or beams and connecting the elongated elements to the guide system.

21. An on-site mobile facility according to claim 1, further comprising:
a plurality of base structures in holes at predetermined locations at the site along the boundaries, and
a plurality of legs, one of the legs being fastened to each of the base structures being part of one of the corners,
wherein the horizontal beams are fastened so that a first end of one of the horizontal beams is fastened to a corner block of one of the legs adjacent the leg in one of the corners, and a first end of the other of the horizontal beams is fastened to the corner block of another one of the legs adjacent the leg in that corner, and second ends of the horizontal beams is fastened to each other via a corner block which is unsupported by a leg, thereby forming a square frame of horizontal beams in that corner.

* * * * *